United States Patent
Alavi

(10) Patent No.: US 11,802,186 B2
(45) Date of Patent: Oct. 31, 2023

(54) CATALYST FORMULATIONS WITH REDUCED LEACHABLE SALTS

(71) Applicant: JOHNS MANVILLE, Denver, CO (US)

(72) Inventor: Kiarash Alavi, Littleton, CO (US)

(73) Assignee: Johns Manville, Denver, CO (US)

( * ) Notice: Subject to any disclaimer, the term of this patent is extended or adjusted under 35 U.S.C. 154(b) by 974 days.

(21) Appl. No.: 16/733,139

(22) Filed: Jan. 2, 2020

(65) Prior Publication Data

US 2020/0148842 A1    May 14, 2020

Related U.S. Application Data

(60) Continuation of application No. 15/631,314, filed on Jun. 23, 2017, now Pat. No. 10,563,024, which is a division of application No. 14/684,680, filed on Apr. 13, 2015, now Pat. No. 9,718,946.

(51) Int. Cl.

| | |
|---|---|
| C08K 7/02 | (2006.01) |
| C08J 5/04 | (2006.01) |
| C08K 7/14 | (2006.01) |
| C09J 179/02 | (2006.01) |
| C08J 5/10 | (2006.01) |
| C08L 5/00 | (2006.01) |
| C08L 7/02 | (2006.01) |
| D04H 1/587 | (2012.01) |

(52) U.S. Cl.
CPC ............... *C08J 5/043* (2013.01); *C08J 5/04* (2013.01); *C08J 5/10* (2013.01); *C08K 7/02* (2013.01); *C08K 7/14* (2013.01); *C08L 5/00* (2013.01); *C08L 7/02* (2013.01); *C09J 179/02* (2013.01); *C08J 2305/00* (2013.01); *D04H 1/587* (2013.01)

(58) Field of Classification Search
CPC ....... C08J 5/043; C08J 5/04; C08J 5/10; C08J 179/02; C08K 7/02; C08K 7/14; C08L 5/00; C08L 7/02
USPC ........................................................ 162/135
See application file for complete search history.

(56) References Cited

U.S. PATENT DOCUMENTS

| | | |
|---|---|---|
| 2007/0027283 A1 | 2/2007 | Swift et al. |
| 2009/0324915 A1 | 12/2009 | Swift et al. |
| 2010/0016143 A1 | 1/2010 | Shooshtari et al. |
| 2010/0222459 A1 | 9/2010 | Kelly et al. |
| 2011/0086567 A1 | 4/2011 | Hawkins et al. |
| 2011/0190425 A1 | 8/2011 | Swift |
| 2012/0058701 A1 | 3/2012 | Zhang et al. |
| 2012/0135152 A1 | 5/2012 | Finch et al. |
| 2013/0005870 A1 | 1/2013 | Kelly et al. |
| 2013/0323493 A1 | 12/2013 | Lee et al. |
| 2014/0134909 A1 | 5/2014 | Guo et al. |
| 2017/0291998 A1 | 10/2017 | Alavi |

*Primary Examiner* — Mark Halpern
(74) *Attorney, Agent, or Firm* — Robert D. Touslee

(57) ABSTRACT

Embodiments of the present technology may include a method of reducing leaching from a fiber-containing composite. The method may include forming an aqueous dispersion of fibers. The method may further include applying a binder composition to the aqueous dispersion of fibers to form a binder-fiber mixture. The binder composition may include a carbohydrate, a nitrogen-containing compound, and a catalyst that catalyzes the reaction between the carbohydrate and the nitrogen-containing compound. The catalyst may be water soluble before curing but water insoluble after curing. In addition, the method may include curing the binder-fiber mixture to form the fiber-containing composite.

20 Claims, 2 Drawing Sheets

CATALYST FORMULATIONS WITH REDUCED LEACHABLE SALTS

CROSS-REFERENCES TO RELATED APPLICATIONS

This application is a continuation of pending U.S. application Ser. No. 15/631,314 filed Jun. 23, 2017, which is a divisional of U.S. application Ser. No. 14/684,680 filed Apr. 13, 2015, now U.S. Pat. No. 9,718,946, issued Aug. 1, 2017.

BACKGROUND

For decades, urea formaldehyde (UF), phenol formaldehyde (PF), and melamine formaldehyde (MF) binder compositions have been used to make glass fiber mats for building materials, including insulation, flooring, siding, facers, and roofing shingles. UF binders were favored for these materials because of their low cost and acceptable strength properties. For materials like roofing shingles, the UF in the binder compositions were often blended with more flexible latex polymers such as polyvinyl acetate, vinyl acrylic, and/or styrene butadiene polymers. The latexes in the binders gave the shingles increased tensile and tear strength, as well as improved their moisture resistance properties.

More recently, the construction industry has moved away from formaldehyde-based binder compositions. Formaldehyde is considered a probable human carcinogen, as well as an irritant and an allergen, and its use in binder formulations for building products, textiles, upholstery, and other materials is increasingly restricted. Thus, makers of building materials have been developing alternative binder formulations that are formaldehyde free.

One alternative binder system that has received considerable attention includes the polymerization of carbohydrates (i.e., sugars) with amine compounds to make a binder that is insoluble in water and adheres well to glass fibers. In addition to being formaldehyde-free, these carbohydrate-based binder formulations can be made from renewably grown natural sugars instead of non-renewable, petroleum-based feedstocks.

Compounds used in the processing of formaldehyde-free binder systems and in making formaldehyde-free fiber composites may ultimately weaken the composite or materials near the composite. Thus, there is a need for alternative compositions and methods to produce formaldehyde-free fiber composites.

BRIEF SUMMARY

Embodiments of the present technology may catalyze Maillard reactions in binder compositions without significant leaching of the catalyst and its derivatives from the finished product. The catalyst may include polymers or oligomers with sulfate or phosphate moieties that are initially water soluble but become water insoluble after curing, making the leaching of the salts from a finished product less likely. These catalysts may not form acids when exposed to water and may then reduce corrosion. The catalysts also may reduce delamination between glass fibers and the binder composition, possibly as a result of not forming acids that react with the glass fibers.

Embodiments of the present technology may include a carbohydrate binder composition. The carbohydrate binder composition may include a carbohydrate, a nitrogen-containing compound, and a catalyst. The catalyst may catalyze a reaction between the carbohydrate and the nitrogen-containing compound. The catalyst may be water soluble in the composition but may become water insoluble after curing the composition.

Embodiments of the present technology may include a method of reducing leaching from a fiber-containing composite. The method may include forming an aqueous dispersion of fibers. The method may further include applying a binder composition to the aqueous dispersion of fibers to form a binder-fiber mixture. The binder composition may include a carbohydrate, a nitrogen-containing compound, and a catalyst that catalyzes the reaction between the carbohydrate and the nitrogen-containing compound. The catalyst may be water soluble before curing but water insoluble after curing. In addition, the method may include curing the binder-fiber mixture to form the fiber-containing composite.

Embodiments of the present technology may also include a fiber-containing composite. The fiber-containing composite may include glass fibers and a binder. The binder may include cured products from a carbohydrate binder composition. The carbohydrate binder composition may include a carbohydrate, a nitrogen-containing compound, and a catalyst that catalyzes a reaction between the carbohydrate and the nitrogen-containing compound. The nitrogen-containing compound may be an amino-amide, an amine salt of an organic acid, an ammonium salt of a carboxylic acid, or a reaction product of a urea compound and an aldehyde-containing compound. The catalyst may be water insoluble in the fiber-containing composite. The fiber-containing composite may have a leach rate of ions that is less than a leach rate of ions from a fiber-containing composite with a sulfate, phosphate, or nitrate salt substituted for the catalyst.

DETAILED DESCRIPTION

Figure 1:
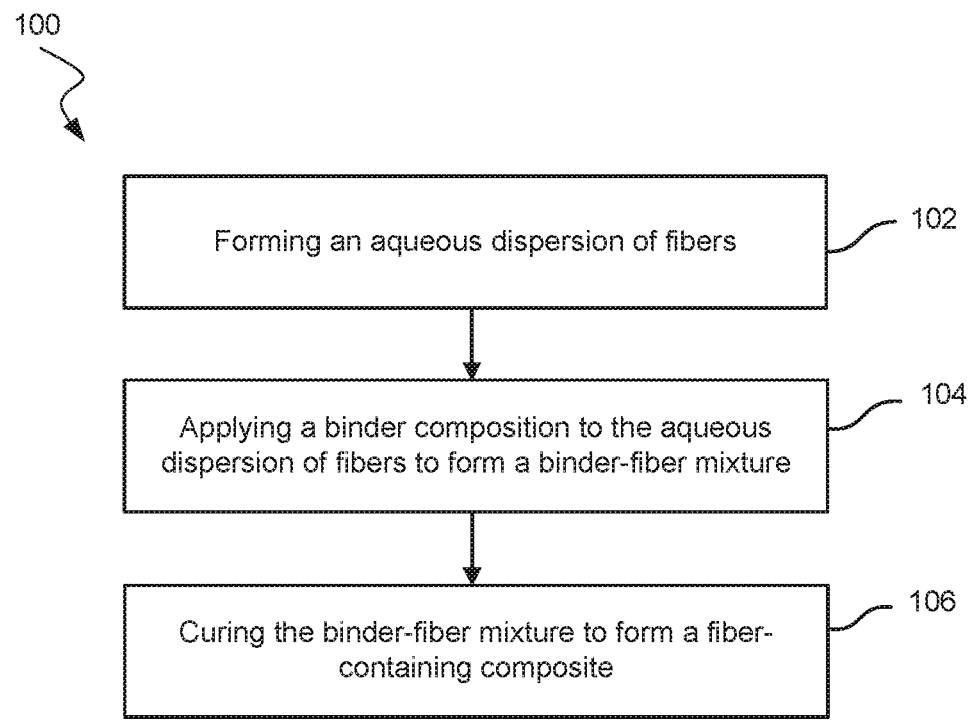
FIG. 1 shows a block flow diagram of a method of reducing leaching according to embodiments of the present technology.

Various thermosetting binders have moved from including formaldehyde-based binders to binders that include polycarboxylic acids crosslinked with products of a Maillard reaction. Conventional, Maillard reaction catalysts may include sulfate, phosphate, nitrate, or carboxylate salts. These salts may be used in an amount from about 2.5% to 15% based on the mass of the solid resin. The catalyst salts may not be consumed during the curing process, and as a result may be present throughout the process and in the final product. These salts may leach out of the binder composition or the cured article. In particular, salts that contain sulfates or phosphates may react with water to form acids, such as sulfuric acid or phosphoric acid. These acids may lead to corrosion during the process or in the final product. These leached ions also may often be hygroscopic, which may increase the amount of water present, which may then increase the amount of leaching of the ions, and thus, may create a reinforcing feedback loop, increasing corrosion.

Additionally, the catalysts may affect glass that should be held together by the binder resins. The surface of glass fibers may include silicates, such as sodium, potassium, magnesium, aluminum, and boron silicates. Acids, such as sulfuric acid, may compete with the metal ions for the silicates.

Acids may convert silicate to silica, affecting the properties of the glass surface. By reducing the metals and silicate concentrations on the glass surfaces, the glass surfaces may not be as stable for binding with the resin. The catalysts may affect the interface between the resin and the glass and cause delamination.

Embodiments of the present technology may include catalysts that have sulfate or phosphate moieties but not as part of salts. The sulfates and phosphate moieties may be attached to a polymer or oligomer and may be insoluble in water after curing. The catalysts may be completely insoluble or have a trace level of solubility. As a result, catalysts of the present technology may not leach out of a cured article and may not form acids that may reduce cure kinetics, mechanical strength, impact resistance, and other properties of the resin or the final product.

Embodiments of the present technology may include a carbohydrate binder composition. The carbohydrate binder composition may include a carbohydrate, a nitrogen-containing compound, and a catalyst. The carbohydrate and nitrogen-containing compound are described later in this specification. Embodiments may include or exclude any carbohydrate, nitrogen-containing compound, group of carbohydrates, or group of nitrogen-containing compounds described herein. The binder composition may be substantially or completely free of formaldehyde.

The catalyst may catalyze a reaction between the carbohydrate and the nitrogen-containing compound. The catalyst may include a sulfate, a sulfonate, a phosphate, or a phosphonate moiety. The sulfate, sulfonate, phosphate, or phosphonate moiety may be attached to an organic compound or a polymer. The catalyst may be a sulfated, sulfonated, phosphate, or phosphonated polymer with a molecular weight of about 20,000 g/mol or more.

Catalysts may include a sulfonated polystyrene, a sulfonated styrene maleic anhydride, a sulfonated polyethylene, a sulfonated polypropylene, a phosphonated polystyrene, a phosphonated styrene maleic anhydride, a phosphanated polyethylene, or a phosphanated polypropylene. Catalysts may also include a sulfated polystyrene, a sulfated styrene maleic anhydride, a sulfated polyethylene, a sulfated polypropylene, a phosphated polystyrene, a phosphated styrene maleic anhydride, a phosphated polyethylene, or a phosphated polypropylene.

The catalyst may be a sulfated, sulfonated, phosphated, or phosphonated oligomer. An oligomer may include from 2 to 100 monomers. The catalyst may include a dimer, a trimer, or a tetramer.

The catalyst may be a sulfated, sulfonated, phosphate, or a phosphanated epoxy. The catalyst may include a reaction product of one mole of epoxy or epoxide moiety and one mole of sulfuric acid, sulfonic acid, phosphoric acid, or phosphonic acid. The epoxy may include an epoxidized plant oil, an epoxidized polyether, bisphenol-A (BPA) epoxy, bisphenol-F (BPF) epoxy, a resole epoxy, or a novolac epoxy. The plant oil may be soybean oil or linseed oil. The catalyst may include a phosphonated epoxidized plant oil.

The sulfated epoxy may be formed by the reaction of an acid with an epoxy and neutralized with a base. For example, BPA may be reacted with sulfuric acid and neutralized with ammonia:

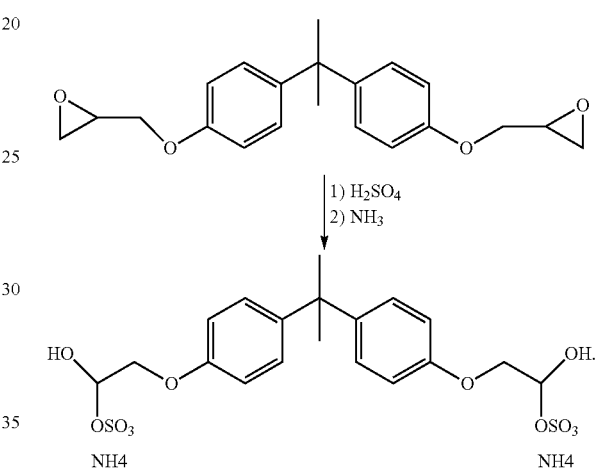

Because BPA has two epoxide moieties, two moles of sulfuric acid may react with each mole of BPA.

Similarly, a phosphated epoxy may be formed by the reaction of an acid with an epoxy and neutralized with a base. For example, an epoxidized plant oil may be reacted with phosphoric acid and neutralized with ammonia:

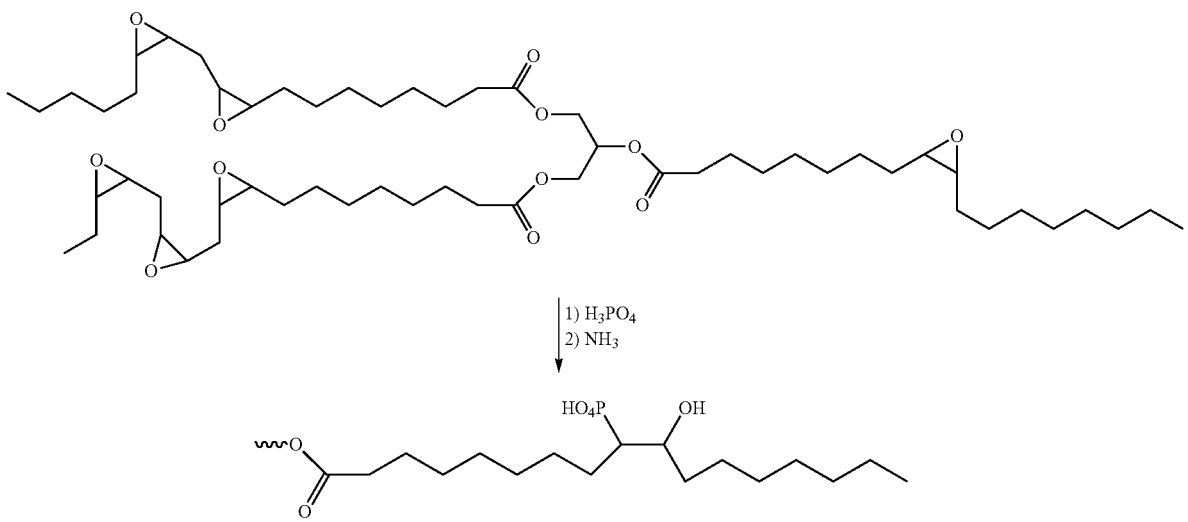

The structure of the catalyst may affect the properties of the resin and the finished product. A highly aromatic catalyst may increase the hardness of the resin or finished product. On the other hand, a highly aliphatic catalyst may increase the impact resistance of the resin or finished product. The structure of the catalyst may be tailored toward the desired properties of the resin and/or the finished product.

The pH of the composition may be from about 7 to about 12 or from about 7 to about 10 in embodiments. The pH of the composition may be raised by the addition of a base. The base may include ammonium hydroxide. The composition may further include a counter ion formed by a reaction of an acid with a base. The counter ion may be ammonium. The base may include ammonia, a substituted amine, or a polyamine. The substituted amine may be an aliphatic mono-substituted amine, an aliphatic di-substituted amine, an aliphatic tri-substituted amine, an aromatic mono-substituted amine, an aromatic di-substituted amine, or an aromatic tri-substituted amine. The counter ion may have a positive charge.

The catalyst may be water soluble in the composition but may become water insoluble after curing the composition. Curing the composition may include heating the composition to a temperature from about 100° C. to about 250° C. The counter ion may play a role in the solubility of the catalyst. The counter ion, when present, may aid the solubility of the catalyst in water. During or after cure, the counter ion may no longer be present, which may lead to the catalyst being insoluble in water. The counter ion may become part of the binder matrix, which may include reacting with binder components. The counter ion may be physically trapped or immobilized within the binder matrix. In some embodiments, the counter ion may decompose or be emitted from the binder during curing.

The catalyst may be insoluble in water and may not be covalently bonded to any other compounds. In some embodiments, some compounds, such as some sulfonates, may react with alcohols or sugars, and therefore may act as a crosslinker. However, covalent bonding or crosslinking may not be the dominant mechanism in which catalysts become immobilized or insoluble.

The catalyst and any combination of catalysts previously described may be part of a total catalyst package. The total catalyst package may include a salt catalyst or salt catalysts. The salt catalysts may catalyze the reaction between the carbohydrate and the nitrogen-containing compound. The salt catalyst may include sulfate, nitrate, or phosphate salts. For example, the salt catalyst may include ammonium sulfate or diammonium phosphate. The salt catalyst or salt catalysts in the composition may have a total weight no more than one-ninth the total weight of the catalysts that are insoluble after cure. The insoluble catalysts may be 90 wt. % or more, 93 wt. % or more, or 95 wt. % or more of the weight of the total catalyst package on a dry basis in embodiments.

As shown in FIG. 1, embodiments of the present technology may include a method 100 of reducing leaching from a fiber-containing composite. Method 100 may include forming an aqueous dispersion of fibers 102. In some embodiments, method 100 may also include passing the aqueous dispersion through a mat forming screen to form a wet mat.

Method 100 may further include applying a binder composition to the aqueous dispersion of fibers to form a binder-fiber mixture 104. Applying the binder composition may include applying the binder composition to a wet mat to form a binder-containing wet mat. Applying the binder composition to the wet mat may include curtain coating the binder composition on the wet mat.

The binder composition may include a carbohydrate, a nitrogen-containing compound, and a catalyst that catalyzes the reaction between the carbohydrate and the nitrogen-containing compound. The carbohydrate may include a reducing sugar. The reducing sugar may include dextrose, fructose, allose, galactose, xylose, ribose, maltose, cellobiose, and lactose. In some examples, the dextrose equivalent of the sugar may be 85 or more or 90 or more. The nitrogen-containing compound may include a diamine or a reaction product of a urea compound and an aldehyde-containing compound. The diamine may include ethylene diamine, 1,3-propanediamine, 1,4-butanediamine, 1,5-pentanediamine, 1,6-hexanediamine, α,α'-diaminoxylene, diethylenetriamine, triethylenetetramine, tetraethylenepentamine, or diamino benzene. The nitrogen-containing compound may include 4,5-dihydroxyimidazolidin-2-one. The carbohydrate and the nitrogen-containing compound may be any carbohydrate and any nitrogen-containing compound described herein.

The catalyst may be water soluble before curing but water insoluble after curing. The catalyst may be any catalyst described herein. In addition, method 100 may include curing the binder-fiber mixture to form a fiber-containing composite 106. Curing may form a non-woven glass fiber mat or any other fiber-containing composite.

Embodiments of the present technology may also include a fiber-containing composite. The fiber-containing composite may include glass fibers and a binder. The fiber-containing composite may be a woven or non-woven mat or any fiber-containing composite described herein. The binder may include cured products from a carbohydrate binder composition. The carbohydrate binder composition may include a carbohydrate, a nitrogen-containing compound, and a catalyst that catalyzes a reaction between the carbohydrate and the nitrogen-containing compound. The carbohydrate may be any carbohydrate described herein. The nitrogen-containing compound may be an amino-amide, an amine salt of an organic acid, an ammonium salt of a carboxylic acid, or a reaction product of a urea compound and an aldehyde-containing compound. The nitrogen-containing compound may be any nitrogen-containing compound described herein. The catalyst may be water insoluble in the fiber-containing composite. The catalyst may be any catalyst described herein. The fiber-containing composite may have a leach rate of ions that is less than a leach rate of ions from a fiber-containing composite with a sulfate, phosphate, or nitrate salt substituted for the catalyst.

The binder compositions may be used to make fiber-containing composites that include woven or non-woven fibers bound together by a cured matrix of the binder. The fibers in the composite may include one or more types of fibers chosen from glass fibers, carbon fibers, mineral fibers, and organic polymer fibers, among other kinds for fibers. At the conclusion of the curing stage, the cured binder may be present as a secure coating on the fiber mat at a concentration of approximately 0.5 to 50 percent by weight of the composition, for example the cured binder may be present at concentration of approximately 1 to 10 percent by weight of the composition.

The fiber-containing composites may take a variety of forms, for example construction materials including piping insulation, duct boards (e.g., air duct boards), and building insulation, reinforcement scrim, and roofing membranes, among other construction materials. Additional examples may include loose-fill blown insulation, duct liner, duct wrap, flexible duct media, pipe insulation, tank insulation, rigid plenum liner, textile duct liner insulation, equipment liner, oven insulation, elevated temperature board, elevated temperature wrap, elevated temperature panel, insulation batts and rolls, heavy density batt insulation, light density batt insulation, exterior foundation insulation board, and marine hull insulation, among other materials. The composites can also find use in printed circuit boards, battery separators, and filter stock, among other applications.

Figure 2A:
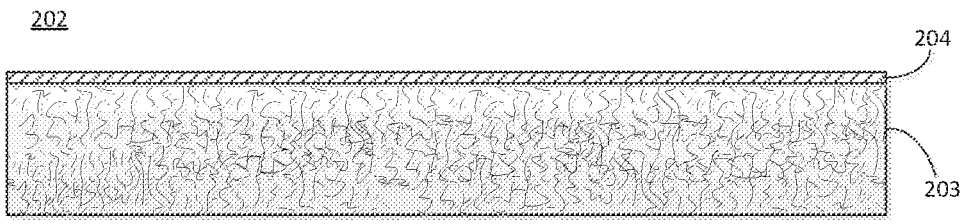
FIGS. 2A-C show simplified illustrations of exemplary composite materials according to embodiments of the present technology.
Figure 2B:
Figure 2C:
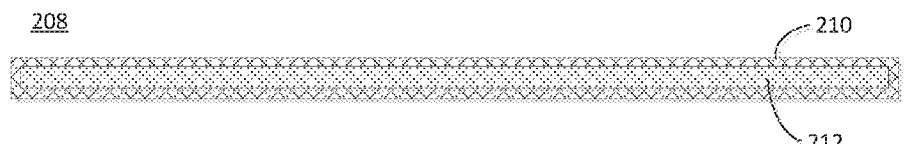

FIGS. 2A-C illustrate some of these exemplary composite materials. FIG. 2A is a simplified schematic of an exemplary fiber-containing batt material 202 that may be used for building insulation. The material 202 may include a batt 203 of non-woven fibers held together by the binder. The fibers may be glass fibers used to make fiberglass insulation (e.g, low-density or high-density fiberglass insulation), or a blend of two or more types of fibers, such as a blend of glass fibers and organic polymer fibers, among other types of fibers. In some examples, a facer 204 may be attached to one or more surfaces of the batt 203.

FIG. 2B is a simplified schematic of an exemplary fiber-containing composite board 206 that may be used as an insulation board, duct board, elevated temperature board, etc. The fibers in board 206 may include glass fibers, organic polymer fibers, inorganic fibers, carbon fibers, mineral fibers, metal fibers, among other types of fibers, and blends of two or more types of fibers.

FIG. 2C is a simplified schematic of an exemplary fiber-containing flexible insulation material 208 that may be used as a wrap and/or liner for ducts, pipes, tanks, equipment, etc. The fiber-containing flexible insulation material 208 may include a facer 210 attached to one or more surfaces of the fiber material 212. Exemplary materials for the facer 210 may include fire-resistant foil-scrim-kraft facing.

Specific examples of fiber-containing composites that use the present binder compositions include low-density fiberglass insulation (e.g., less than about 0.5 lbs/ft$^3$) and high-density fiberglass insulation.

The present binder compositions may be used in methods of binding fibers to make the fiber-containing composites. The fiber-containing composites may include fibers of one or more types, such as glass fibers, carbon fibers, and organic polymer fibers, among other types of fibers. The binder compositions used to make the composites may include a reducing sugar and a reaction product of a urea compound and an aldehyde-containing compound as described herein. The methods may include the step of applying the binder composition to a mat of woven or non-woven fibers to make a curable binder-fiber amalgam. The curable amalgam is then cured to form the fiber-containing composite of fibers bound together by the cured binder.

The step of applying the binder composition to the fibers may be done by a variety of techniques including spraying, spin-curtain coating, curtain coating, and dipping-roll coating. The composition can be applied to freshly-formed fibers, or to fibers that have been cooled and processed (e.g., cut, coated, sized, etc.). The binder may be provided to the applicator as a premixed composition or may be supplied to the applicator in separate solutions for the crosslinking agent and the reducing sugar component. In some instances where the binder composition includes a solvent, a portion or all of the solvent may be removed from the composition before or after its application on the fibers.

The step of curing the binder composition may include exposing the composition applied to the fibers to an environment conducive to curing. For example, the curable amalgam of fibers and binder composition may be heated to a binder curing temperature. Exemplary binder curing temperatures may include a temperature range from 100° C. to 250° C. The curing amalgam may be heated to the curing temperature for a period of 1 minute to 100 minutes (e.g., 20 minutes).

The curing step may produce the finished fiber-containing composite, such as fiberglass insulation. In some exemplary methods, additional agents like an anti-dusting agent may be applied during or following the curing step.

Exemplary Binder Compositions

The present carbohydrate binder compositions may include one or more types of carbohydrate, nitrogen-containing compounds, and thickening agents, among other binder components. When the binder compositions are cured, the carbohydrates and nitrogen-containing compounds form a crosslinked polymer that in some instances is referred to as a Maillard polymerization product. Thickening agents are selected that create little or no interference with the crosslinking reaction of the polymer precursors so that the binder composition can be thoroughly and quickly cured after deposition on the fiber substrate (e.g., a glass fiber mat).

Exemplary thickening agents are added to control the viscosity of the binder compositions that are ultimately cured to make the adhesive binder component of the fiber product. The thickening agents may be polymeric materials and may be partially or fully water soluble. They are selected to enhance the binder compositions rheological properties (e.g., increase the composition's viscosity and surface tension) without substantially interfering with the composition's curability into an adhesive binder for the substrate fibers. Exemplary thickening agents may include polysaccharides, such as xanthan gum, guar gum, modified starches and the like; neutralized polyacrylic acid, such as sodium polyacrylate, modified celluloses, such as hydroxyethyl cellulose (HEC), carboxymethyl cellulose (CMC), as well as their soluble salts, polyacrylamides, and polyvinyl alcohols. The exemplary thickening agents may have a weight average molecular weight typically from 100,000 to 2,000,000 g/mol (e.g., 200,000 to 1,000,000 g/mol). The thickening agent (or agents) are typically added to the binder composition prior to its deposition on the fiber substrate, or alternatively may be added separately and approximately simultaneously with the other components of the binder composition to the fiber substrate.

The concentration of thickening agent in the binder composition may depend in part on the concentration of the other binder components in the composition. The carbohydrate binder compositions may be aqueous mixtures or solutions, and their viscosities depend in part on the how much the polymer precursors have been diluted by the water. For example, some concentrated binder compositions (e.g., solids concentrations of 45 to 70 wt. % or more) may have viscosities in the hundreds of centipoise at room temperature. The concentrated resins are typically diluted with water to, for example, a solids concentration of 10 to 30 wt. % solids (e.g., 10 to 20 wt. % solids), reducing the binder composition's viscosity to less than 3 cPs at room temperature. Other binder compositions may have functional viscosities at high concentrations (e.g., 20 cPs at 50 wt. % solids concentration) but should be diluted to address processing challenges such as LOI, weight, and uniformity problems for the applied binder composition.

Thickening agents may be added to increase the viscosity of the aqueous binder composition to a range of 7 to 50 cPs at room temperature (i.e., 20° C.), as measured by a Brookfield viscometer operating at a speed of 60 revolutions per minute. Typically, binder composition viscosities in this range can be achieved at thickening agent concentrations between 0.03 to 0.3 wt. % of the total composition. The concentration range of thickening agent can depend on the type of agent used. For example, adding hydroxyethyl cellulose to a concentration range of 0.05 to 0.3 wt. % may be sufficient to increase the composition's viscosity into a 7 to 50 cPs range. The same viscosity range may be met by adding 0.03 wt. % to 0.2 wt. % xanthan gum to the aqueous binder composition.

In addition to the thickening agents, the binder compositions may also contain a surfactant that provides more precise control over the surface tension of the composition. The surfactant may be added in amounts to achieve a surface tension for the binder composition of 35 to 50 mN/m (e.g., 38 to 48 mN/m, 40 to 47 mN/m, etc.). These surfactants may include cationic, anionic, and/or non-ionic surfactants.

The binder formulations of the binder compositions may include one or more types of carbohydrates and nitrogen-containing compounds. The nitrogen-containing compounds may act as crosslinking agents for the carbohydrates in the cured binder. The carbohydrates used in the binder formulations may include reducing sugars that contain at least one aldehyde group, or are capable of forming an aldehyde group through isomerization. Exemplary reducing sugars may include glucose (dextrose), fructose, glyceraldehyde, galactose, allose, xylose, ribose, maltose, cellobiose, and lactose, among others.

The nitrogen-containing compounds may include a variety of compounds that can distinguish the class of binder formulation. One class of binder formulations uses an amino-amide as the nitrogen containing compound, which itself is a reaction product of an amine with a saturated or unsaturated reactant. Another class of binder formulations has as the nitrogen-containing compound a reaction product of a urea compound and aldehyde-containing compound. Each of these classes of nitrogen-containing compounds are described more detail below.

1. Carbohydrate/Amino-Amide Binder Formulations

The nitrogen-containing compounds may include amines capable of undergoing conjugate addition with a saturated or unsaturated reactant to form an amino-amide. The amino-amide then reacts during curing with the carbohydrate to form a polyimide. The amino-amide addition products may be formed by mixing the amine and saturated or unsaturated reactant in an aqueous medium at room temperature. The resulting addition products are either water-soluble, water-dispersible, or are present as an emulsion. In some binder formulations, the formation of the amino-amide from the reaction of the amine precursor with the saturated or unsaturated reactant may occur before the introduction of the carbohydrate, while other formulations mix all three precursors (i.e., the amine, saturated or unsaturated reactant, and carbohydrate) before the amino-amide is formed.

Each amine may have two or more primary and/or secondary amine groups to react and crosslink two or more carbohydrate molecules. The amines may include aliphatic, cycloaliphatic and aromatic amines. They may be linear or branched, and have additional functionalities and linkages such as alcohols, thiols, esters, amides, acids, and ethers, among others. Exemplary amines may include 1,2-diethylamine, 1,3-propanediamine, 1,4-butanediamine, 1,5-pentanediamine, 1,6-hexanediamine, diaminoxylene, diethylenetriamine, triethylenetetramine, tetraethylenepentamine, as well as combinations of two or more of these amines. Natural and synthetic amino acids such as lysine, anginine, hestidine, etc., may also be used.

The curable amino-amide is formed through the selection of an unsaturated or saturated reactant that is an anhydride, carboxylic acid, ester, and salts and mixtures of such reactants. These unsaturated reactants may include maleic acid, fumaric acid, maleic anhydride, mono- and di-esters of maleic acid and fumaric acid, and salts and mixtures of these. Ammonium salts of the unsaturated acids of their monoesters conveniently can be utilized. Saturated reactants may include, without limitation, succinic anhydride, succinic acid, mono and diesters of succinic acid, glutaric acid and anhydride, phthalic acid and anhydride, tetrahydro phthaic acid and anhydride, mono and diesters of acid anhydrides and salts of the acids, and their mono esters.

In some formulations, the amino-amide product may be oligomerized before reacting with the carbohydrate. This oligomerization may be facilitated by heating the amino-amide solution until the amino-amide is dimerized, trimerized, tetramerized, etc., into the amino-amide oligomer. The heating conditions may include raising the temperature of the amino-amide solution to, for example, 120° C. to 150° C. for a time of up to 5 hours. In some instances, the oligomerized amino-amide product forms a stronger, more rigid cured binder product than then amino-amide monomer.

Then during the binder curing step, the majority of the carbohydrate reacts with the amino-amide intermediate, which contains an amic acid functional group, (i.e., an amide linkage in the vicinity of a carboxylic acid). An amic acid functional group is typically more reactive than a simple carboxylic acid. The amount of carbohydrate added is generally such that the molar ratio of carboxylic acid in the amino-amide to carbonyl or ketone in the carbohydrate is from 1:5 to 50:1, for example a ratio of 1:20 to 20:1, or a ratio of 1:10 to 10:1. Additional details about carbohydrate/amino-amide binder formulation are described in co-assigned U.S. patent application Ser. No. 12/539,263 to Shooshtari et al, filed Aug. 11, 2009, and titled "Curable Fiberglass Binder," the entire contents of which are herein incorporated by reference for all purposes.

2. Carbohydrate/Urea Derivative Binder Formulations

The nitrogen-containing compounds may include urea derivative reaction products of urea (i.e., $H_2N-CO-NH_2$), and/or substituted ureas, with diformaldehyde compounds such as glyoxal. One specific class of these urea derivatives include imidazolidine compounds such as 4,5-dihydroxy-imidazolidin-2-one, which has the chemical structure:

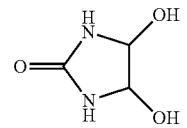

4,5-dihydroxyimidazolidin-2-one

More specifically, the urea compound may be a substituted or unsubstituted urea having the formula:

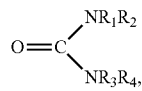

where $R_1$, $R_2$, $R_3$, and $R_4$ are independently chosen from a hydrogen moiety (H), an alkyl group, an aromatic group, an alcohol group, an aldehyde group, a ketone group, a carboxylic acid group, and an alkoxy group. Exemplary alkyl groups include straight-chained, branched, or cyclic hydrocarbons of varying size (e.g., $C_1$-$C_{12}$, $C_1$-$C_8$, $C_1$-$C_4$, etc.). Exemplary aromatic (i.e., aryl) groups include substituted or unsubstituted phenyl moieties, among other aromatic constituents. Exemplary alcohol groups include —ROH, where R may be a substituted or unsubstituted, saturated or unsaturated, branched or unbranched, cyclic or acyclic, organic moiety. For example, R may be —$(CH2)_n$—, where n may be 1 to 12. Exemplary alcohols may also include polyols having two or more hydroxyl groups (—OH) in alcohol group. Exemplary aldehyde groups include —RC(=O)H, where R may be a monovalent functional group (e.g., a single bond), or a substituted or unsubstituted, saturated or unsaturated, branched or unbranched, cyclic or acyclic, organic moiety, such as —$(CH2)_n$—, where n may be 1 to 12. Exemplary ketone groups may include —RC(=O)R' where R and R' can be variety of carbon containing constituents. Exemplary carboxylic acid groups may include —R—COOH, where R may be a monovalent functional group, such as a single bond, or a variety of carbon-containing constituents. Exemplary alkoxy groups include —$OR_x$, where $R_x$ is an alkyl group.

The aldehyde-containing compound may contain one or more aldehyde functional groups. Exemplary aldehyde-containing compounds include acetaldehyde, propanaldehyde, butyraldehyde, acrolein, furfural, glyoxal, gluteraldehyde, and polyfurfural among others. Exemplary aldehyde-containing compounds may also include substituted glyoxal compounds having the formula:

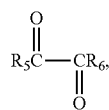

where $R_5$ and $R_6$ may be independently hydrogen (H), an alkyl group, an aromatic group, an alcohol group, an aldehyde group, a ketone group, a carboxylic acid group, and an alkoxy group, among other groups.

The reaction products of the urea compound and the aldehyde-containing compound may include an imidazolidine compound having the formula:

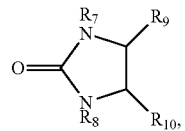

where $R_7$, $R_8$, $R_9$, and $R_{10}$ are independently, —H, —OH, —$NH_2$, an alkyl group, an aromatic group, an alcohol group, an aldehyde group, a ketone group, a carboxylic acid group, and an alkoxy group. In one specific example of the reaction between urea and glyoxal, the reaction product may be 4,5-dihydroxyimidazolidin-2-one.

The carbohydrate/urea derivative binder formulations may also include one or more catalysts to increase the rate of the crosslinking reactions between the carbohydrates and crosslinking agents when the composition is exposed to curing conditions. Exemplary catalysts may include alkaline catalysts and acidic catalysts. The acidic catalysts may include Lewis acids (including latent acids and metallic salts), as well as protic acids, among other types of acid catalysts. Lewis acid catalysts may include a salt of a deprotonized anion such as a sulfate, sulfite, nitrate, nitrite, phosphate, halide, or oxyhalide anion in combination with one or more metallic cations such as aluminum, zinc, iron, copper, magnesium, tin, zirconium, and titanium. Exemplary Lewis acid catalysts include aluminum sulfate, ferric sulfate, aluminum chloride, ferric chloride, aluminum phosphate, ferric phosphate, and sodium hypophosphite (SHP), among others. Exemplary latent acids include acid salts such as ammonium sulfate, ammonium hydrogen sulfate, mono and dibasic ammonium phosphate, ammonium chloride, and ammonium nitrate, among other latent acid catalysts. Exemplary metallic salts may include organo-titanates and organo-zirconates (such as those commercially manufactured under the tradename Tyzor® by DuPont), organo-tin, and organo-aluminum salts, among other types of metallic salts. Exemplary protic acids include sulfuric acid, phosphoric acid, hydrochloric acid, nitric acid, sulfonic acid compounds (i.e., R—S(=O)$_2$—OH) such as p-toluenesulfonic acid and methanesulfonic acid, and carboxylic acids, among other protic acids. Catalyst compositions may also include combinations of two or more catalysts, for example the combination of ammonium sulfate and diammonium phosphate.

The pH of the present binder compositions may vary depending upon the types and relative concentrations of the components used. Typically the pH of the present binder compositions are slightly acidic to alkaline with a pH range of about 6 to 8 (e.g., 6.5 to 7.5). The binder compositions have a pH that creates relatively little or no acid-based corrosion of metal fabrication equipment.

The reaction product of the urea derivative nitrogen-containing compound acts as a crosslinking agent for the carbohydrate. During a curing stage, the urea derivative can bond to two or more carbohydrates (either polymerized or unpolymerized) to form a crosslinked, polymeric cured binder.

The molar ratio of the (1) crosslinking reaction product of the urea compound and the aldehyde-containing compound to (2) the carbohydrate generally ranges from 1:2 to 1:50. Exemplary ratios of crosslinking agent to carbohydrate include a range from 1:4 to 1:10. Additional details about carbohydrate/urea derivative binder formulations are described in co-assigned U.S. patent application Ser. No. 13/490,638 to Shooshtari et al, filed Jun. 7, 2012, and titled "Formaldehyde-Free Binder Compositions with Urea-Formaldehyde Reaction Products," the entire contents of which are herein incorporated by reference for all purposes.

3. Carbohydrate/Nitrogen-Containing Salt Binder Formulations i. Salts of Inorganic Acids with Amines In additional carbohydrate binder formulations, the nitrogen-containing compounds may include a nitrogen-containing salt. For example, the nitrogen-containing compound may include the salt product of the combination of an inorganic acid and an amine (e.g., an amine-acid salt). Exemplary inorganic acids may include a phosphorous-containing acid such as phosphoric acid, pyrophosphoric acid, phosphorous acid, and phosphine, among others. Exemplary inorganic acids may also include oxygenated inorganic acids such as sulfuric acid, sulfurous acid, nitric acid, boric acid, hypochloric acid, chlorate acid, among others. They may also include non-oxygenated inorganic acids such as hydrochloric acid and hydrogen sulfide, among others.

Exemplary amines may include polyamines (e.g., diamines, triamines, etc.) having at least one primary amine group. For example, the amines may include ethylene diamine, 1,3-propanediamine, 1,4-butanediamine, 1,5-pentanediamine, 1,6-hexanediamine, α,α'-diaminoxylene, diethylenetriamine, triethylenetetramine, tetraethylenepentamine, as well as combinations of two or more of these amines.

When the amine-acid salt reacts with the carbohydrate under binder curing conditions the binder is formed. Exemplary binder systems include the combination of an amine-acid salt of 1,6-hexanediamine and phosphoric acid with the carbohydrate dextrose (HPD), the combination of an amine-acid salt formed from the combination of ethylene diamine and phosphoric acid with dextrose (EPD). Additional details about these amine-acid salt and carbohydrate binder formulations are described in co-assigned U.S. patent application Ser. No. 12/539,211, filed Aug. 11, 2009 to Shooshtari, the entire contents of which are herein incorporated by reference for all purposes.

ii. Salts of Inorganic Acids with Amines and Organic Species

Some carbohydrate/amine-acid salt binder formulations further include some combination of an organic acid, organic anhydride, and/or an alkanol amine. Exemplary organic acids may include polycarboxylic acid such as citric acid and or maleic acid. Exemplary organic anhydrides may include maleic anhydride, phthalic anhydride, methylphthalic anhydride, glutaric anhydride, tetrahydrophthalic anhydride, perhydrophthalic anhydride, itaconic anhydride, succinic anhydride, and trimellitic anhydride, among other anhydrides.

Exemplary alkanol amines may have the formula:

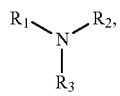

where $R_1$, $R_2$, and $R_3$ are independently chosen from, a hydrogen, a $C_{1-10}$ alkyl group, an aromatic group, and a $C_{1-10}$ hydroxy alkyl group, and wherein at least one of $R_1$, $R_2$, and $R_3$ is a hydroxyl alkyl group.

Specific examples of alkanol amines may include methanol amines such as mono-, di-, and tri-, methanol amine; ethanol amines such as monoethanol amine (MEA), diethanol amine (DEA), and triethanol amine (TEA); isopropanol amines such as mono-, di-, and tri-, isopropanol amine; methyldiethanol amine; ethyldiethanol amine; propyldiethanol amine; isopropyldiethanol amine; and n-butyldiethanol amine, among others.

Exemplary carbohydrate binder formulations may include the combination of a carbohydrate, amine-acid salt, and organic acid. These include binder formulations of dextrose, ethylene diamine phosphate, and citric or maleic acid. Additional details about these carbohydrate/amine-acid salt/organic acid binder formulations are described in co-assigned U.S. patent application Ser. No. 13/478,765, filed May 23, 2012 to Shooshtari et al., the entire contents of which are herein incorporated by reference for all purposes.

Exemplary carbohydrate binder formulations may also include the combination of a carbohydrate, amine-acid salt, organic anhydride, and alkanol amine. This include binder formulations of the reaction products of monoethanol amine ("E") and maleic anhydride ("M") combined with ethylenediamine phosphate ("EP") and dextrose ("D") to make binder compositions referred to as EMEPDs. In still other exemplary binder formulations, the amine-acid salt may be eliminated. This includes formulations of the reaction products of monoethanol amine ("E") and maleic anhydride ("M") with the carbohydrate dextrose to make binder compositions referred to as EMDs. Additional details about these carbohydrate/amine-acid salt/anhydride-alkanol amine binder formulations are described in co-assigned U.S. patent application Ser. No. 13/559,769, filed Jul. 27, 2012 to Shooshtari et al., the entire contents of which are herein incorporated by reference for all purposes.

Exemplary binder formulations may include additional compounds combined with the reducing sugar, organic acid, and amine salt of an inorganic acid. For example, urea may also be included with the other binder components. Exemplary, urea-containing binder compositions may include ethylene diamine phosphate ("EP"), citric acid ("C"), urea ("U"), and dextrose ("D") combined to make a binder composition referred to as EPCUD. Exemplary molar ratios of these components may include Ethylenediamine:Phosphoric Acid:Citric Acid:Urea:Dextrose of 1:1:0.5:1:6.

iii. Ammonium Salts of Carboxylic Acids

In still additional carbohydrate binder formulations, the nitrogen-containing compounds may include an ammonium salt of a polycarboxylic acid. Exemplary ammonium salts of polycarboxylic acids may be formed from the reaction of ammonia ($NH_3$) with the polycarboxylic acid to form the ammonium salt. It should be appreciated that other types of ammonium ions can function as the cation in the ammonium-polycarboxylate salt, such as $(NH_3R_1)^+$, $(NH_2R_1R_2)^+$, and $(NHR_1R_2R_3)^+$, where $R_1$, $R_2$, and $R_3$ are each independently chosen from an alkyl, cycloalkyl, alkenyl, cycloalkenyl, hetrocyclyl, aryl, and heteroaryl, among other organic groups.

Exemplary polycarboxylic acids may include dicarboxylic acids, tricarboxylic acids, etc. Dicarboxylic acids may include maleic acid, and tricarboxylic acids may include citric acid.

The binder formulations may include the combination of a carbohydrate (e.g., a reducing sugar) with the ammonium salt of the polycarboxylic acid. For example, the binder composition may include dextrose and triammonium citrate.

4. Carbohydrate Blends with Latex and/or Solution Polymers

This group of carbohydrate binder compositions is distinguished by the inclusion of the components of a second binder in the formulation. The second binder may be a latex binder and/or solution polymer with a significantly higher viscosity than the carbohydrate binder composition. In some instances, the second binder may act as the sole thickening agent in the carbohydrate binder composition, while in other instances the second binder may complement other thickening agents to get the composition to a target viscosity.

The second binder may include latex binders having a Brookfield viscosity of about 100 cPs or more (spindle 18 operating at a speed of 60 rpm) at 20° C. Exemplary second binders may include acrylic binders, among others. The second binder may be present up to about half the weight of the total binder composition (e.g., 1 to 50 wt. %; 1 to 20 wt. %; etc.).

5. Additional Binder Components

The present carbohydrate binder compositions may further include one or more additional components such as adhesion prompters, oxygen scavengers, solvents, emulsifiers, pigments, organic and/or inorganic fillers, flame retardants, anti-migration aids, coalescent aids, curing catalysts, wetting agents, biocides, plasticizers, organosilanes, anti-foaming agents, colorants, waxes, suspending agents, antioxidants, and secondary crosslinkers, among other components. In some instances, some or all of the additional components are pre-mixed with the binder composition before it is applied to fibers and cured. In additional instances, some or all of the additional components may be introduced to the curable, curing, and/or cured fiber-containing composite during or after the initial binder composition is applied to the fibers.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Additionally, details of any specific embodiment may not always be present in variations of that embodiment or may be added to other embodiments.

Where a range of values is provided, it is understood that each intervening value, to the tenth of the unit of the lower limit unless the context clearly dictates otherwise, between the upper and lower limits of that range is also specifically disclosed.

Each smaller range between any stated value or intervening value in a stated range and any other stated or intervening value in that stated range is encompassed. The upper and lower limits of these smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a method" includes a plurality of such methods and reference to "the salt" includes reference to one or more salts and equivalents thereof known to those skilled in the art, and so forth. The invention has now been described in detail for the purposes of clarity and understanding. However, it will be appreciated that certain changes and modifications may be practice within the scope of the appended claims.

What is claimed is:

1. A method of reducing leaching from a fiber-containing composite, the method comprising:
    forming an aqueous dispersion of fibers;
    applying a binder composition to the aqueous dispersion of fibers to form a binder-fiber mixture; and
    curing the binder-fiber mixture to form the fiber-containing composite, wherein:
        the binder composition comprises a carbohydrate, a nitrogen-containing compound, and a catalyst that catalyzes a reaction between the carbohydrate and the nitrogen-containing compound, and
        the catalyst is water soluble before curing but water insoluble after curing.

2. The method of claim 1, wherein the carbohydrate comprises a reducing sugar, and the nitrogen-containing compound is selected from the group consisting of a diamine and a reaction product of a urea compound and an aldehyde-containing compound.

3. The method of claim 1, wherein the nitrogen-containing compound comprises a diamine selected from the group consisting of ethylene diamine, 1,3-propanediamine, 1,4-butanediamine, 1,5-pentanediamine, 1,6-hexanediamine, α,α'-diaminoxylene, diethylenetriamine, triethylenetetramine, tetraethylenepentamine, and diamino benzene.

4. The method of claim 1, wherein the binder composition further comprises a counter ion formed by a reaction of an acid with a base comprising ammonia, a substituted amine, or a polyamine.

5. The method of claim 4, wherein:
    the base comprises the substituted amine, and
    the substituted amine comprises an aliphatic mono-substituted amine, an aliphatic di-substituted amine, an aliphatic tri-substituted amine, an aromatic mono-substituted amine, an aromatic di-substituted amine, or an aromatic tri-substituted amine.

6. The method of claim 1, wherein the binder composition is at a concentration of 1 to 10 percent by weight of the fiber-containing composite after curing the binder-fiber mixture.

7. The method of claim 1, further comprising:
    passing the aqueous dispersion of fibers through a mat forming screen to form a wet mat, wherein:
        applying the binder composition to the aqueous dispersion of fibers comprises applying the binder composition to the wet mat.

8. The method of claim 7, wherein applying the binder composition to the aqueous dispersion of fibers comprises curtain coating the binder composition on the wet mat.

9. The method of claim 1, wherein the carbohydrate comprises dextrose, fructose, allose, galactose, xylose, ribose, maltose, cellobiose, or lactose.

10. The method of claim 1, wherein the carbohydrate comprises a reducing sugar with a dextrose equivalent of 85 or more.

11. The method of claim 1, wherein the catalyst comprises a sulfate, sulfonate, phosphate, or phosphonate moiety.

12. The method of claim 1, wherein the catalyst comprises a polymer comprising a sulfate, sulfonate, phosphate, or phosphonate moiety.

13. The method of claim 1, wherein the catalyst is selected from the group consisting of a sulfonated polystyrene, a sulfonated styrene maleic anhydride, a sulfonated polyethylene, a sulfonated polypropylene, a phosphonated polystyrene, a phosphonated styrene maleic anhydride, a phosphanated polyethylene, and a phosphanated polypropylene.

14. The method of claim 1, wherein the catalyst is a sulfated oligomer, a sulfonated oligomer, a phosphate oligomer, or a phosphanated oligomer.

15. The method of claim 1, wherein the catalyst comprises a reaction product of one mole of an epoxy compound having one or more epoxide moieties and one mole of sulfuric acid or phosphoric acid for each epoxide moiety.

16. The method of claim 15, wherein the epoxy compound is selected from the group consisting of an epoxidized plant oil, an epoxidized polyether, a bisphenol-A epoxy, a bisphenol-F epoxy, a resole epoxy, and a novolac epoxy.

17. The method of claim 15, wherein the epoxy compound is an epoxidized soybean oil or an epoxidized linseed oil.

18. The method of claim 1, wherein the catalyst is a sulfonated or phosphanated polymer with a molecular weight of about 20,000 g/mol or more, and the sulfonated or phosphanated polymer is neutralized with a base to a pH from about 7 to about 10.

19. The method of claim 1, wherein:

the catalyst is a first catalyst, the binder composition further comprises a salt catalyst or salt catalysts, the salt catalyst or salt catalysts catalyze the reaction between the carbohydrate and the nitrogen-containing compound, the salt catalyst or salt catalysts comprise sulfate, nitrate, or phosphate salts, and the salt catalyst or salt catalysts in the binder composition have a total weight no more than one-ninth the weight of the first catalyst on a dry basis.

20. The method of claim 1, wherein the catalyst is a crosslinker.

* * * * *